United States Patent

Limberg

[15] 3,651,347

[45] Mar. 21, 1972

[54] SIGNAL TRANSLATING STAGE PROVIDING DIRECT VOLTAGE TRANSLATION INDEPENDENT OF SUPPLIED OPERATING POTENTIAL

[72] Inventor: Allen LeRoy Limberg, Somerville, N.J.

[73] Assignee: RCA Corporation

[22] Filed: Sept. 28, 1970

[21] Appl. No.: 76,031

[52] U.S. Cl. .......................................307/297, 323/1, 323/4, 323/19

[51] Int. Cl. ........................................................H03k 1/12

[58] Field of Search ....................307/296, 297; 323/1, 4, 19, 323/22 T

[56] References Cited

UNITED STATES PATENTS

| | | | |
|---|---|---|---|
| 3,508,081 | 4/1970 | Matsuda | 323/4 X |
| 3,555,402 | 1/1971 | Bozarth, Jr. | 323/4 X |
| 3,383,612 | 5/1968 | Harwood | 330/22 |
| 3,512,047 | 5/1970 | Garde | 323/4 X |
| 3,534,245 | 10/1970 | Limberg | 323/4 |
| 3,536,986 | 10/1970 | Perlman | 323/4 |
| 3,555,309 | 1/1971 | Limberg | 307/297 |

*Primary Examiner*—Donald D. Forrer
*Assistant Examiner*—R. C. Woodbridge
*Attorney*—Eugene M. Whitacre

[57] ABSTRACT

A signal translating stage includes a transistor having base and emitter electrodes coupled in parallel with a PN-junction poled in the same direction as the base-emitter junction of the transistor. A first resistor couples the collector electrode of the transistor to a terminal supplying input signals referenced to a first direct current level, while a second resistor couples the base electrode of the transistor to the emitter electrode of a further transistor, the base electrode of which is coupled via a third resistor to the signal supply terminal. By selecting the resistance values of the first and second resistors to be substantially equal and by providing a signal bypass within the network so formed by these interconnections, an output signal will be developed at the collector electrode of the first mentioned transistor referenced to a second direct current level. Such second level is primarily dependent on the number of base-to-emitter offset voltages between the second and third resistors and independent of the value of the first direct current level.

8 Claims, 3 Drawing Figures

INVENTOR.
ALLEN L. LIMBERG
BY
Charles Brodsky
Attorney

SIGNAL TRANSLATING STAGE PROVIDING DIRECT VOLTAGE TRANSLATION INDEPENDENT OF SUPPLIED OPERATING POTENTIAL

BACKGROUND OF THE INVENTION

1. Field of the Invention

This invention relates to an electrical circuit especially suited for fabrication using integrated circuit techniques and, more particularly, to such a circuit in which similar collector currents flow in transistors of the same type classification having their base electrodes and emitter electrodes connected in parallel, and in semiconductor diodes connected across those same electrodes and closely matched in transistor characteristics.

2. Description of the Prior Art

Such a circuit as described above is disclosed in pending U.S. application Ser. No. 866,122, filed Oct. 8, 1969, now U.S. Pat. No. 3,531,730 and assigned to the same assignee as the present invention. In an embodiment of the invention there disclosed, a pair of integrated transistors A,B have their base electrodes and emitter electrodes connected in parallel and their collector electrodes individually coupled to a pair or resistors. One transistor, A, furthermore, has its collector electrode directly connected to its base electrode to form a rectifier diode. A direct voltage source is connected to the end of the second resistor remote from the collector electrode of the second transistor B, and is effective to controllably reference a developed output signal to a level different from that to which is referenced a corresponding input signal applied to the end of the first resistor remote from its interconnection with the collector electrode of the first transistor A. The control over the output signal level so referenced is primarily dependent upon the valve of the direct voltage source, so that temperature variations within the circuit exert substantially little effect upon its operation.

Whereas the Ser. No. 866,122 application (U.S. Pat. No. 3,531,730) references the output signal to a level determined by the value of a direct voltage supply source, my pending application Ser. No. 680,483, filed Nov. 3, 1967, now U.S. Pat. No. 3,555,309 discloses a modified circuit wherein the output signal is referenced to a direct voltage primarily dependent upon the $V_{BE}$ voltage of the transistors employed, where the term $V_{BE}$ represents the average base-to-emitter offset voltage of a transistor which is operating as the active device in an amplifier circuit or the like. There, a pair of resistors are serially coupled between the emitter electrode of a first transistor and a point of ground potential, with the junction between the resistors being coupled to the base electrode of a second transistor having a grounded emitter electrode. A direct connection is further made between the base electrode of the first transistor and the collector electrode of the second transistor, at which point input signals are applied for translation. With a bypass capacitor connected at the base electrode of the second transistor, for example, these interconnections form a feedback loop which references the output signal developed at the emitter electrode of the first transistor to a direct voltage substantially equal to $(N+1)V_{BE}$, measured with respect to ground. Such direct voltage will thus be seen to be substantially independent of the value of any direct voltage source employed. N, in this instance, represents the ratio between the serially coupled pair of resistors, with the value of the resistor closer to the emitter electrode of the first transistor being in the numerator and with that of the farther resistor being in the denominator.

SUMMARY OF THE INVENTION

As will become clear hereinafter, the signal translating stage of the present invention also operates to reference an output signal to a direct voltage different from that to which the input signal is referenced. Furthermore, this re-referenced direct voltage level is also independent of the value of the direct voltage source employed and equal to a multiple of $V_{BE}$ voltages. However, the $V_{BE}$ multiples are provided by a plurality of cascade connected base-to-emitter semiconductor junctions respectively coupled by means of substantially equal resistors between the collector electrode of a first transistor and the anode electrode of a PN-junction poled in the same direction as the base-emitter diode of the transistor, across which it is coupled. Such arrangement—while seemingly less desirable due to its use of added base-emitter junctions—proves attractive in that a smaller capacitor may be used as a signal bypass in the network formed by the various circuit interconnections. Whereas values for the bypass capacitor in my Ser. No. 680,483 application (U.S. Pat. 3,555,309) were of the order of 10 microfarads, a comparable capacitor in the embodiment of the invention to be described may be of the order of 0.2 microfarads. While the first capacitive unit might comprise an electrolytic device, the capacitive unit according to the invention may be a much cheaper ceramic component.

BRIEF DESCRIPTION OF THE DRAWINGS

This advantage of the invention will become apparent from a consideration of the following drawings in which.

DETAILED DESCRIPTION OF THE INVENTION

Figure 1:
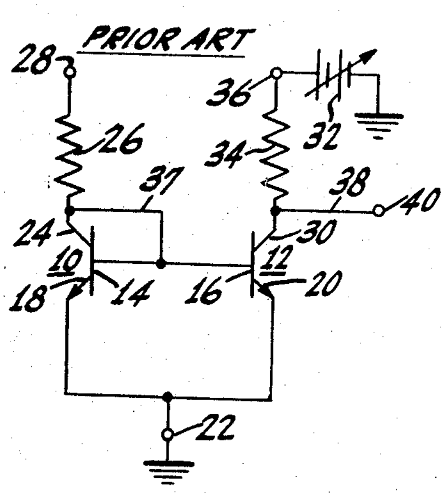
FIG. 1 is a schematic circuit diagram of an electrical circuit similar to that described in pending U.S. application Ser. No. 866,122, now U.S. Pat. 3,531,730.

Referring now to the prior art circuit of FIG. 1, the arrangement there shown includes a pair of transistors 10 and 12. The base electrodes 14 and 16 of these transistors are interconnected, as are their emitter electrodes 18 and 20 by means of a point of reference or ground potential 22. The collector electrode 24 of transistor 10 is shown coupled via a first resistor 26 to an input terminal 28 while the corresponding electrode 30 of transistor 12 is coupled to a source of controllable direct voltage 32 through a second, equal resistor 34 and a terminal 36. The collector electrode 24 is further connected by a lead 37 to the base electrode 14, thereby arranging transistor 10 to provide diode or rectifier type action. The collector electrode 30 is similarly connected by a lead 38 to an output terminal 40.

In operation, current will flow in the collector electrode circuit of transistor 10 when the instantaneous value of an input signal applied to terminal 28 exceeds the average forward base-to-emitter $V_{BE}$ voltage of that transistor, developed at the collector electrode 24. Since the base electrodes 14 and 16 and the emitter electrodes 18 and 20 of the two transistors are connected together—and assuming the transistors 10 and 12 are of the same type classification or essentially alike—similar collector currents will flow in each. Where the transistors 10 and 12 are further constructed on a monolithic integrated circuit chip, these currents will tend to be identical because the base-to-emitter voltages of the transistors will be equal and because the transistors would share the same thermal environment and have like diffusion profiles. It will, therefore, be seen that the value of these collector currents will be given by:

$$i_{10} = i_{12} = \frac{V_{in} - V_{BE_{10}}}{R_{26}} \qquad (1)$$

where $i_{10}$ and $i_{12}$ = the collector electrode currents of transistors 10 and 12 respectively, and where:

$V_{in}$ = the instantaneous value of the input signal a applied to terminal 28;

$V_{BE_{10}}$ = the forward base-to-emitter voltage of transistor 10; and $R_{26}$ = the resistance value of resistor 26.

The signal then developed at output terminal 40 by the current flow $i_{12}$ through resistor 34 can be expressed as:

$$V_{out} = V_{ref}\ \frac{R_{34}}{R_{26}}\left(V_{in} - V_{BE_{10}}\right) \qquad (2)$$

where $V_{ref}$ = the value of the direct voltage source 32;

$R_{34}$ = the resistance value of resistor 34; and $V_{in}$, $V_{BE_{10}}$ and $R_{26}$ are as previously defined.

It will be apparent from this latter expression that the DC level of the developed output signal can be primarily controlled by varying the value of the voltage source 32. Variation of the resistance ratio $R_{34}/R_{26}$ to vary the effect of the DC component of the applied input signal or of the forward voltage of transistor 10 offers only secondary control in determining the output DC level, and is not generally available where resistors 26 and 34 are fixed. The resistance ratio $R_{34}/R_{26}$, furthermore, will be relatively stable in an integrated circuit structure in the presence of temperature variations so that control of the output DC level will remain substantially constant during temperature changes. In this regard, it will be understood that any change in the DC level tending to be produced by variations in the base-to-emitter voltage $V_{BE_{10}}$ with such temperature variations would be of a minor nature, and, if desired, may be easily compensated.

It will also be apparent that if the ratio between voltages $V_{ref}$ and $V_{in}$ is selected to equal the ratio between resistors 34 and 26, then expression (2) reduces to:

$$V_{out} = \left(\frac{V_{ref}}{V_{in}}\right) V_{BE_{10}} \qquad (3)$$

In this structure, no appreciable degree of freedom exists by which one can obtain a direct voltage at terminal 40 equal to an arbitrary multiple of $V_{BE}$.

Figure 2:
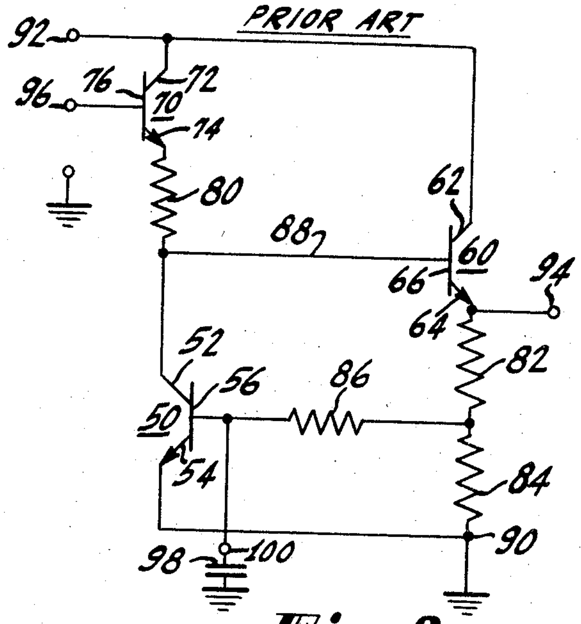
FIG. 2 is a schematic circuit diagram of an electrical circuit similar to that described in my pending application Ser. No. 680,483, now U.S. Pat. 3,555,309.

Referring now to FIG. 2, the arrangement there shown includes three transistors 50, 60 and 70 and four resistors 80, 82, 84 and 86. The transistor 50 is essentially arranged in a common emitter amplifier configuration, with its collector electrode 52 connected by resistor 80 to the emitter electrode 74 of transistor 70, and with its emitter electrode 54 connected to a reference terminal 90, shown at ground potential. The second transistor 60 is arranged in a common collector type configuration, with its collector electrode 62 connected to an energizing potential terminal 92 and with its emitter electrode 64 connected to the reference terminal 90 through resistors 82 and 84 serially coupled therebetween. The emitter electrode 64 of transistor 60 is also coupled to an output terminal 94 while the junction between resistors 82 and 84 is coupled by resistor 86 to the base electrode 56 of transistor 50. The collector electrode 52 of transistor 50 is additionally coupled to the base electrode 66 of transistor 60 by a lead 88, whereas the collector electrode 72 of transistor 70 is coupled to the energizing potential terminal 92. The base electrode 76 of transistor 70 is coupled to a source of input signals, represented in the drawing by a terminal 96, while an appropriate load circuit (not shown) is connected between output terminal 94 and reference terminal 90, respectively. A bypass capacitor 98 is also included in the feedback loop formed by these interconnections—for example, to couple the base electrode 56 of transistor 50 to ground. In an integrated circuit version of the arrangement shown in FIG. 2, it will be understood that, depending upon the available area on the chip, the capacitor 98 may be connected as an external component. In such case, the capacitor 98 would be connected to the chip through a terminal 100, in the manner shown.

In the operation of the stage so described, input signals which are referenced to a first direct current (DC) level are supplied at terminal 96 to the base electrode 76 of transistor 70. These signals may be referenced, for example, to a fraction of the operating potential applied to terminal 92, and are subsequently translated by the base-emitter junction of transistor 70 and resistor 80 to the base electrode 66 of transistor 60. The DC component of the signals developed at the output emitter electrode 64 of transistor 60 would normally be at a voltage level one $V_{BE}$ volts below that existing at its input base electrode 66, but because of the negative feedback loop bounded by lead 88, the collector-base junction of transistor 50, the base-emitter junction of transistor 60, and resistors 82 and 86, that level is constrained to one which is substantially equal to $(N+1)V_{BE}$, where N represents the resistance ratio $R_{82}/R_{84}$ between resistors 82 and 84. Any tendency for the input DC level to vary (due to a variation in the value of the operating potential supplying, for example) is offset by the feedback within the loop so that the output DC component becomes stabilized against such change.

That this output level is $(N + 1)V_{BE}$ can be seen from the fact that with a proper polarity potential source connected between terminals 92 and 90, a point of equilibrium is reached at which one $V_{BE}$ voltage offsets are developed across the base-emitter junctions of each of transistors 50 and 60. The series combination of the base-emitter junction of transistor 60 and resistor 82, however, is connected in parallel with the collector-base junction of transistor 50 by lead 88 and by resistor 86. Assuming resistor 86 to be of a resistance value such that the base current flow of transistor 50 produces negligible voltage drop across it, then the quiescent voltage developed between the collector and emitter electrodes of transistor 50 equals the sum of the $V_{BE}$ voltage offsets of transistors 50 and 60 plus the voltage drop across resistor 82. With the emitter electrode 54 of transistor 50 grounded by terminal 90, a potential substantially equal to the $V_{BE}$ voltage offset of transistor 50 is developed at the common junction of resistors 82 and 84 relative to ground terminal 90, while a potential equal to that $V_{BE}$ voltage plus the voltage drop across resistor 82 is developed at output terminal 94 relative to ground. With a resistance value for resistor 84 which is small relative to the input impedance of transistor 50, this latter voltage drop substantially equals $NV_{BE}$, where N is as previously defined. The potential developed at output electrode 94 with respect to ground is thus seen to be $(N + 1) V_{BE}$. Where transistors 50 and 60 are each composed of the same semiconductor material, the potential developed at the collector electrode 52 of transistor 50 would be $(N+2)V_{BE}$ relative to ground. As will be appreciated, the value of these DC components can be controlled by varying the resistance $R_{82}/R_{84}$.

The alternating current AC component of the signals developed at the emitter electrode 64 of transistor 60, on the other hand, is bypassed to ground by the capacitor 98 and, therefore, is not degenerated by the feedback loop. That component thus produces an output signal by emitter follower action at terminal 94. The resulting rereferencing of the DC component of the input signal in this manner, without substantially affecting the AC component, is particularly desirable where terminal 94 is connected to additionally bias a succeeding stage designed to operate with multiple $V_{BE}$ bias voltages instead of with the input fractional operating potential voltage.

Figure 3:
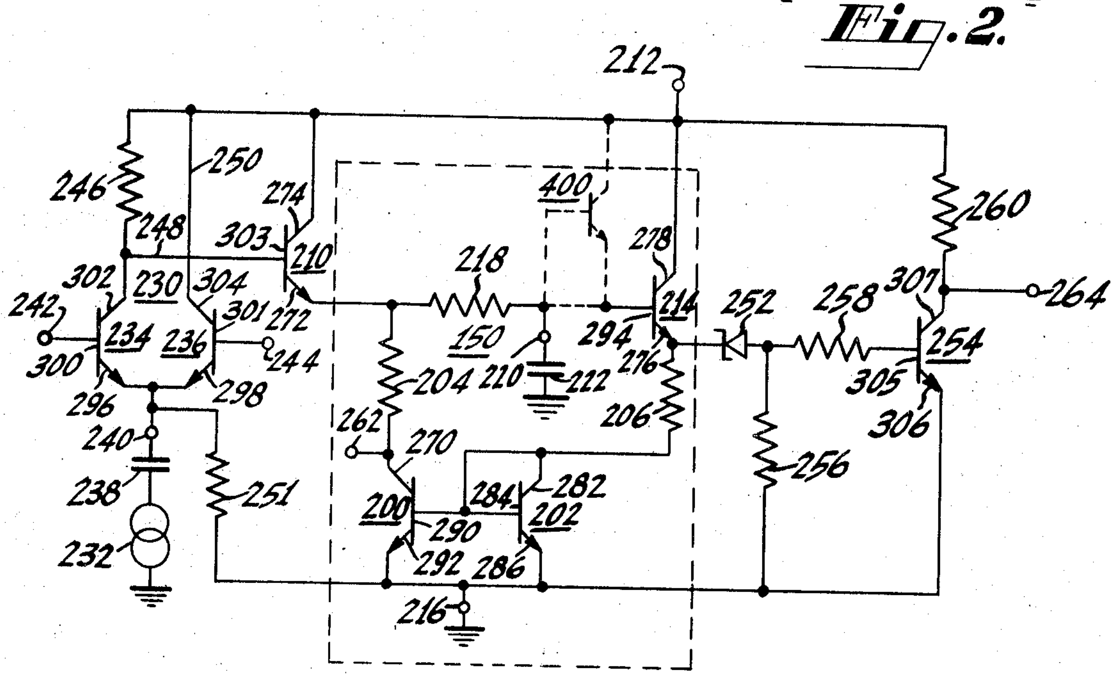
FIG. 3 is a schematic circuit diagram of a signal translating stage embodying the present invention.

The arrangement of FIG. 3 constructed in accordance with the invention is similar to that of FIG. 2 in that an input signal referenced to a first direct level is translated with its alternating current component intact to an output terminal at which the direct current component is referenced to a multiple $V_{BE}$ value. The arrangement is also similar in that the direct current voltage established is primarily dependent on $V_{BE}$ voltage offsets, and varies not as a function of operating potential, but as a function of temperature. This, however, is oftentimes not a problem in integrated circuit design but an advantage—for example, in those cases where the direct current voltage sets the base-emitter bias for a succeeding transistor amplifier stage DC coupled to the terminal 94. In such case, the variation in DC voltage is in a direction to offset similar variations with temperature in the base-to-emitter voltage offset of the following transistor and helps to maintain more constant current flow therein.

The arrangement of FIG. 3 differs from that of FIG. 2, however, in that the number of $V_{BE}$ offset voltages to which the output signal is referenced is determined by the number of base-to-emitter voltage offsets coupled in cascade connection between the two bias resistors used. It will also be seen that present integrated circuit construction techniques makes possible the connection of a plurality of these units in only slightly more space than is occupied by one component alone, but, in any event, requires only an acceptably small portion of the chip. While admittedly occupying more area to provide the multiple $V_{BE}$ output than the resistor ratio arrangement of FIG. 2, the arrangement of FIG. 3 will be seen to permit a significant savings in cost of the capacitor employed to bypass the feedback network.

Thus, the arrangement of FIG. 3 is shown as it might be used in a color television receiver to re-reference an applied chrominance signal to a different direct current level while maintaining its alternating current components intact. The re-referencing stage 150 is included within the dotted lines, and includes two transistors 200 and 202 and two resistors 204 and 206. In particular, resistor 204 couples the collector electrode 270 of transistor 200 to the emitter electrode 272 of an emitter-follower transistor 210, the collector electrode 274 of which is directly connected to an operating potential terminal 212. Resistor 206, in turn, couples the emitter electrode 276 of a second emitter-follower transistor 214 to the connected collector and base electrodes 282, 284 of transistor 202, which provides rectifier or diode type operation when its emitter electrode 286 is coupled to a reference terminal 216, as shown. The collector electrode 278 of transistor 214 is further coupled to terminal 212. The base electrode 284 of transistor 202 is also coupled to the corresponding base electrode 290 of transistor 200, the emitter electrode 292 of which is coupled to terminal 216. An additional resistor 218 is shown being coupled between the emitter electrode 272 of transistor 210 and the base electrode 294 of transistor 214, with that base electrode 294 being coupled to ground by a terminal 220 and a bypass capacitor 222.

The input signal for the re-referencing stage 150 comprises a current-splitting type of automatic gain controlled chrominance amplifier 230 including a signal supply 232 coupled by means of an input capacitor 238 and a terminal 240 to the connected emitter electrodes 296, 298 of a pair of transistors 234, 236. Also respectively coupled to the base electrodes 300, 301 of these transistors via terminals 242 and 244 are a source of automatic color control voltage and a source of reference voltage (not shown). The collector electrode 302 of transistor 234 is coupled to the operating potential 212 via a resistor 246 and to the base electrode 303 of transistor 210 via a lead 248. The corresponding collector electrode 304 of transistor 236 is coupled by means of a lead 250 to the operating supply terminal 212. A resistor 251 lastly couples the emitter electrodes 296, 298 to the reference potential terminal 216.

Also shown in the arrangement of FIG. 3 are a Zener diode 252, a further transistor 254 and three resistors 256, 258 and 260. The cathode of Zener diode 252 is coupled to the emitter electrode 276 of transistor 214, while the anode of Zener 252 is connected to the junction of resistors 256 and 258. The ends of these resistors remote from Zener diode 252 are in turn respectively connected to reference terminal 216 and to the base electrode 305 of transistor 254. The emitter electrode 306 of this transistor is further directly coupled to terminal 216 while the collector electrode 307 is coupled to terminal 212 by means of resistor 260.

The re-referenced chrominance signal is developed at the collector electrode 270 of transistor 200 in a stage 150 (at output terminal 262) while the transistor 254 acts as a color-killer for the chrominance channel. The Zener diode 252 provides the threshold control level for the killer transistor 254 and capacitor 222 serves as the signal bypass for the 3.58 MHz. signal in providing the re-referencing and color-killer action.

In the absence of signal—and assuming the value of resistor 218 to be selected sufficiently small so that no appreciable voltage drop is developed across it due to the base current flow of transistor 214—the stage 150 will develop a direct voltage at the collector electrode 270 of transistor 200 equal to $2V_{BE}$ volts when resistors 204 and 206 are of equal resistance value. This can be shown by first noting the direct current flow through resistor 206 to be represented by the expression:

$$I=\frac{V_{276}-V_{BE_{202}}}{R_{206}} \qquad (4)$$

where $V_{276}$ = the direct voltage at the emitter electrode 276 of transistor 214;

$V_{BE}$ = the average base-to-emitter offset of transistor 202; and $R_{206}$ = the resistance value of resistor 206.

Because the PN-junction of transistor 202 is connected in parallel with the base-emitter junction of transistor 200, the current through resistor 204 will substantially equal that through resistor 206 —and, because these two resistors are selected equal, the direct voltage drops developed across these resistors will also be equal. Since, however, resistor 204 is effectively returned to the base electrode 294 of transistor 214 while resistor 206 is returned to the one $V_{BE}$ lower voltage emitter electrode 276, the direct voltage at the collector electrode 270 of transistor 200 will be greater than that at the collector electrode 282 of transistor 202 by that one $V_{BE}$ amount. With the diode connection of transistor 202 providing a one $V_{BE}$ offset at collector electrode 282, it will be seen that the direct voltage developed at output terminal 262 connected to transistor 200 will then be positive with respect to ground by the noted $2V_{BE}$ value. Such arrangement, as far as direct current referencing is concerned, is thus substantially similar to the specific construction of FIG. 2 where $R_{82}/R_{84}=1$.

It will also be apparent that this direct voltage can be increased by integral numbers of $V_{BE}$ volts by cascade-connecting further base-emitter junctions between resistor 218 and transistor 214. Thus, with the addition of the transistor 400 connected as shown in phantom, (with its base electrode coupled to resistor 218 and with the base electrode 294 of transistor 214 now coupled to the emitter electrode of transistor 400), the direct voltage developed at terminal 262 will equal $3V_{BE}$—with a further transistor, $4V_{BE}$, or generally $(N'+1)V_{BE}$ where $N'$ equals the number of base-to-emitter voltage offsets between resistors 206 and 218.

Capacitor 222, as with the signal translating stage of FIG. 2, permits the degeneration of any DC voltage variation at the emitter electrode 272 of transistor 210 but serves to bypass the network for any 3.58 MHz. alternating signals. Such signals, when applied, will therefore be developed without significant alteration at output terminal 262, but referenced, however, to the new 2 or new $V_{BE}$ direct voltage level noted.

One significant advantage presented by the re-referencing stage of FIG. 3 over that of FIG. 2 is that the FIG. 3 arrangement permits the use of a bypass capacitor of much smaller value. That is, in the FIG. 2 configuration the input impedance at the base electrode 56 of the common emitter transistor 50 is fairly low, so that the coupling resistor 86 would be selected small in order to limit degeneration of the alternating signal. However, in order to provide the desired capacitive bypass—such as for the 3.58 MHz. chrominance signals—the capacitor 98 should be selected of a fairly high value, as much as 10 microfarads or so, typically an electrolytic component. With the FIG. 3 construction on the other hand, the input impedance at the base electrode 294 of transistor 214 is substantially higher, being essentially the product of the forward current gain of transistor 214 (beta) times the sum of the emitter resistance of transistor 214 and the fairly large resistance value of resistor 206. Resistor 218 can thus be increased towards the point where it is beta times greater than the value of resistor 86 of FIG. 2 and still provide little degeneration of the alternating signal. To bypass the feedback loop, the capacitor 222 of FIG. 3 can then be reduced by this same beta factor, so that a 0.2 microfarad unit might suffice. Such smaller capacitor could thus be a cheaper ceramic component. A second feature which follows the use of such smaller capacitor is the severe integration such unit affords any large amplitude signals being translated. This reduces the possible effect such signals might have on the output direct current level established whereas, with the relatively larger valued capacitor of FIG. 2, such signals could overdrive transistor 50 and change the direct voltage established at output terminal 94.

Returning to the arrangement of FIG. 3—and in the presence of applied chrominance signals—it will be seen that the automatic color (i.e., voltage applied to terminal 242 serves to split the input current flow from signal source 232 between the transistors 234 and 236 in accordance with specific color reproduction demands. The variable direct voltage level so developed at the collector electrode 302 of transistor 234 is translated through the base-emitter junctions of transistors 210 and 214 to the cathode of Zener diode 252. As will be appreciated, if the voltage developed at the cathode of Zener 252 is insufficient to cause the diode to conduct, a resultant direct voltage will be developed at the collector electrode 307 of transistor 254 i.e., at terminal 264) of a sufficiently high value to inactivate one or more stages in the chrominance chain and to prevent undesirable, random color signals from appearing in the reproduced picture during monochrome reception. On the other hand, during reception of a color signal, the direct voltage at the cathode of Zener 252 will be adjusted by the automatic color control voltage to a level sufficient to cause the diode to conduct, producing a resulting drop in direct voltage at terminal 264 to energize the chrominance stages and permit faithful signal reproduction in full color in any well known manner.

Whereas the present invention has been described in the context of its preferred embodiment, it will be readily apparent that modifications can be made by those skilled in the art without departing from the essential contributions made by the teachings hereof. Thus, it will be noted that the rectifier connected transistor 202 of FIG. 3 could be replaced by a semiconductor diode connected in parallel with the base and emitter electrodes of transistor 200 to give comparable performance when poled in the same direction as that base-emitter junction. Similarly, the transistors 214 and 400—as well as others of any cascade-connected chain between resistors 206 and 218—could be replaced by such semiconductor diode devices to provide the predetermined number of offset voltages desired.

What is claimed is:

1. The combination comprising:
 a first semiconductor device having first, second and third electrodes;
 a second semiconductor device having at least first and second electrodes and exhibiting a conduction characteristic related to that exhibited by said first device and of corresponding conductivity;
 means directly connecting said first electrodes of said semiconductor devices;
 means directly connecting said second electrodes of said semiconductor devices to cause substantially similar direct currents to flow in electrical circuits respectively coupled to said third electrode of said first semiconductor device and to said first electrode of said second semiconductor device as set forth hereinafter;
 means supplying a source of direct voltage;
 means, including a first resistance, coupling said direct voltage supply means to said third electrode of said first semiconductor device to apply a first direct energizing potential to said first device; and
 means, including a second resistance and a predetermined number of semiconductor devices N′ which each exhibit a characteristic voltage offset thereacross in response to current flow therethrough, serially coupled between said supply means and said first electrode of said second semiconductor device to apply a second direct energizing potential to said second device;
 with said first and second resistances being selected of substantially equal resistance value to provide equal direct voltages thereacross in response to said substantially similar direct currents and a direct voltage at said third electrode of said first device substantially equal to the sum of the voltage offset developed between said first and second electrodes of said second semiconductor device and the voltage offsets developed across said predetermined N′ number of semiconductor devices taken together, independent of the magnitude of said supplied direct voltage.

2. The combination of claim 1 wherein said second semiconductor device has a third electrode interconnected with its said first electrode, wherein said first and second semiconductor devices comprise a pair of transistors, and wherein said first, second and third electrodes of said devices correspond to the base, emitter and collector electrodes of said transistors, respectively.

3. The combination of claim 2 wherein said serially coupled semiconductor devices comprise at least one transistor having its base electrode coupled to said supply means and its emitter electrode coupled to said second resistance.

4. The combination of claim 2 wherein said serially coupled semiconductor devices comprise at least two transistors arranged in cascade connection with the base electrode of the first of such transistors being coupled to said supply means, with the emitter electrode of the last of such transistors being coupled to said second resistance, and with the emitter electrode of the first of such transistors being coupled to the base electrode of the last of such transistors.

5. The combination of claim 2 wherein said means supplying a source of direct voltage supplies input signals having a first direct voltage component, wherein there is additionally included a signal bypass network coupled in circuit between said supply means and the base electrode of said second transistor responsive to said input signals to provide corresponding output signals at the collector electrode of said first transistor but having a second direct voltage component, and wherein said second direct voltage component is of a value substantially equal to the sum of the voltage offset developed between said base and emitter electrodes of said second transistor and the voltage offsets developed across said predetermined N′ number of serially coupled semiconductor devices taken together.

6. The combination of claim 5 wherein said supply means comprises the emitter electrode of a third transistor, wherein said bypass network includes a third resistance coupling the emitter electrode of said third transistor to said predetermined N′ number of semiconductor devices, and wherein said network additionally includes a capacitor coupled between the emitter electrodes of said first and second transistors and the junction between said third resistance and said predetermined number of semiconductor devices.

7. The combination comprising:
 first, second and third transistors, each of corresponding conduction polarity;
 first and second terminals;
 direct current connections from the emitter electrode of each of said first and second transistors to said first terminal;
 a direct current connection between the base electrodes of said first and second transistors;
 a direct current connection between the base and collector electrodes of said second transistor;
 a direct current connection between the collector electrode of said third transistor and said second terminal;
 a first resistor coupling the collector electrode of said first transistor to a source of direct voltage;
 a second resistor coupling the collector electrode of said second transistor to the emitter electrode of said third transistor; and
 means coupling the base electrode of said third transistor to said direct voltage source;
 with said first and second resistors being selected of substantially equal resistance value to provide equal direct voltages thereacross in response to direct current flows in the collector electrode circuits of said first and second transistors and a direct voltage at the collector electrode of said first transistor substantially equal to the sum of the voltage offset developed between the base and emitter electrodes of said second transistor and the voltage offset developed between the base and emitter electrodes of said third transistor, each in response to current flow therethrough and independent of the magnitude of said supplied direct voltage.

8. The combination of claim 7 wherein said source of direct voltage comprises a source of alternating signals having a first direct voltage component, wherein the base electrode of said third transistor is coupled to said source by a third resistor and to said first terminal by a signal bypass capacitor, and wherein output signals corresponding to said alternating signals are developed at the collector electrode of said first transistor but having a second direct voltage component of a value substantially equal to the aforesaid voltage offset sum.

* * * * *

UNITED STATES PATENT OFFICE
CERTIFICATE OF CORRECTION

Patent No. 3,651,347 Dated March 21, 1972

Inventor(s) Allen LeRoy Limberg

It is certified that error appears in the above-identified patent and that said Letters Patent are hereby corrected as shown below:

Column 2, Line 75 - the portion reading -

$$"V_{out} = V_{ref} \frac{R_{34}}{R_{26}} \left( V_{in} - V_{BE_{10}} \right)"$$

should read --

$$V_{out} = V_{ref} - \frac{R_{34}}{R_{26}} \left( V_{in} - V_{BE_{10}} \right) \quad --$$

Column 7, Line 9 - the portion reading "the automatic color (i.e., voltage applied to terminal 242" should read -- the automatic color control voltage applied to terminal 242 --

Column 7, Line 20 - after "254" and before "i.e." insert a parenthesis -- ( --.

Signed and sealed this 5th day of December 1972.

(SEAL)
Attest:

EDWARD M.FLETCHER,JR.
Attesting Officer

ROBERT GOTTSCHALK
Commissioner of Patents